Patented Oct. 26, 1937

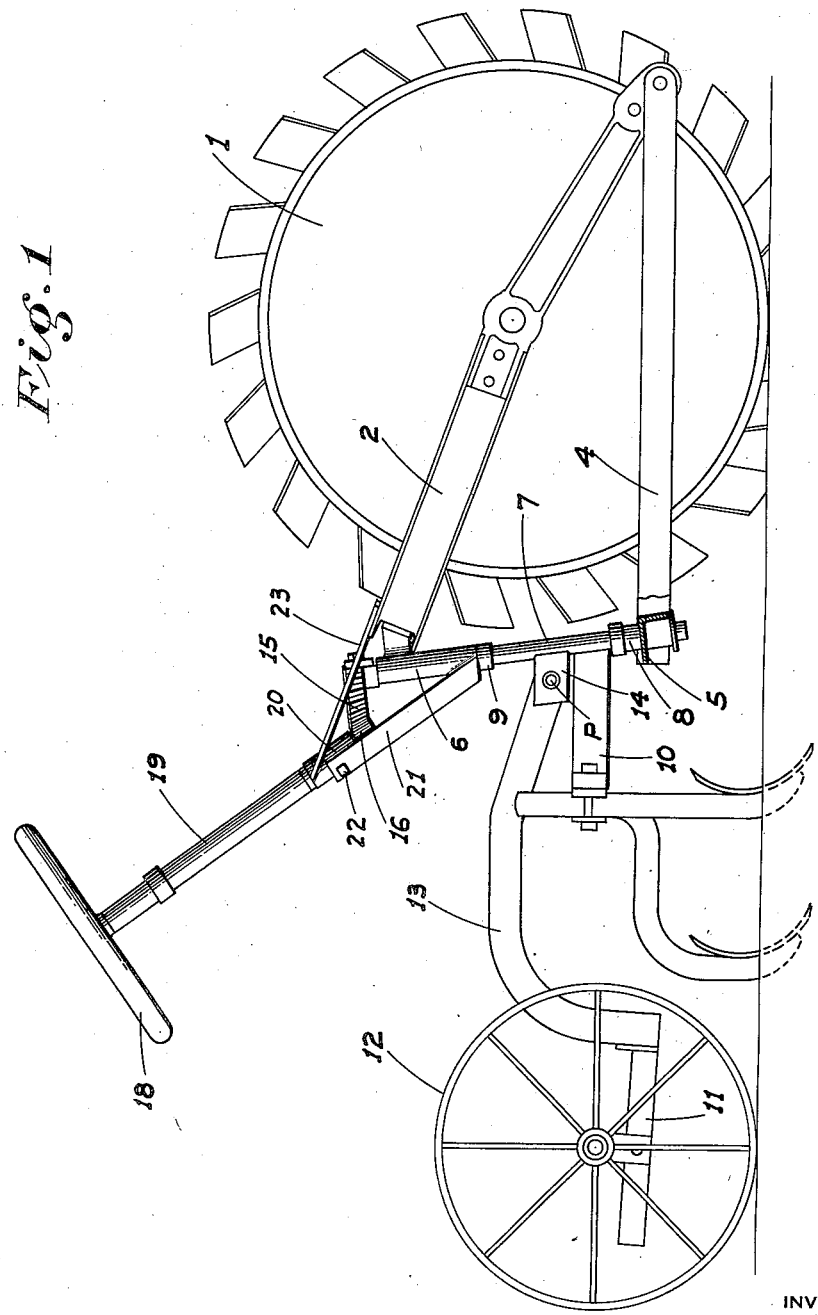

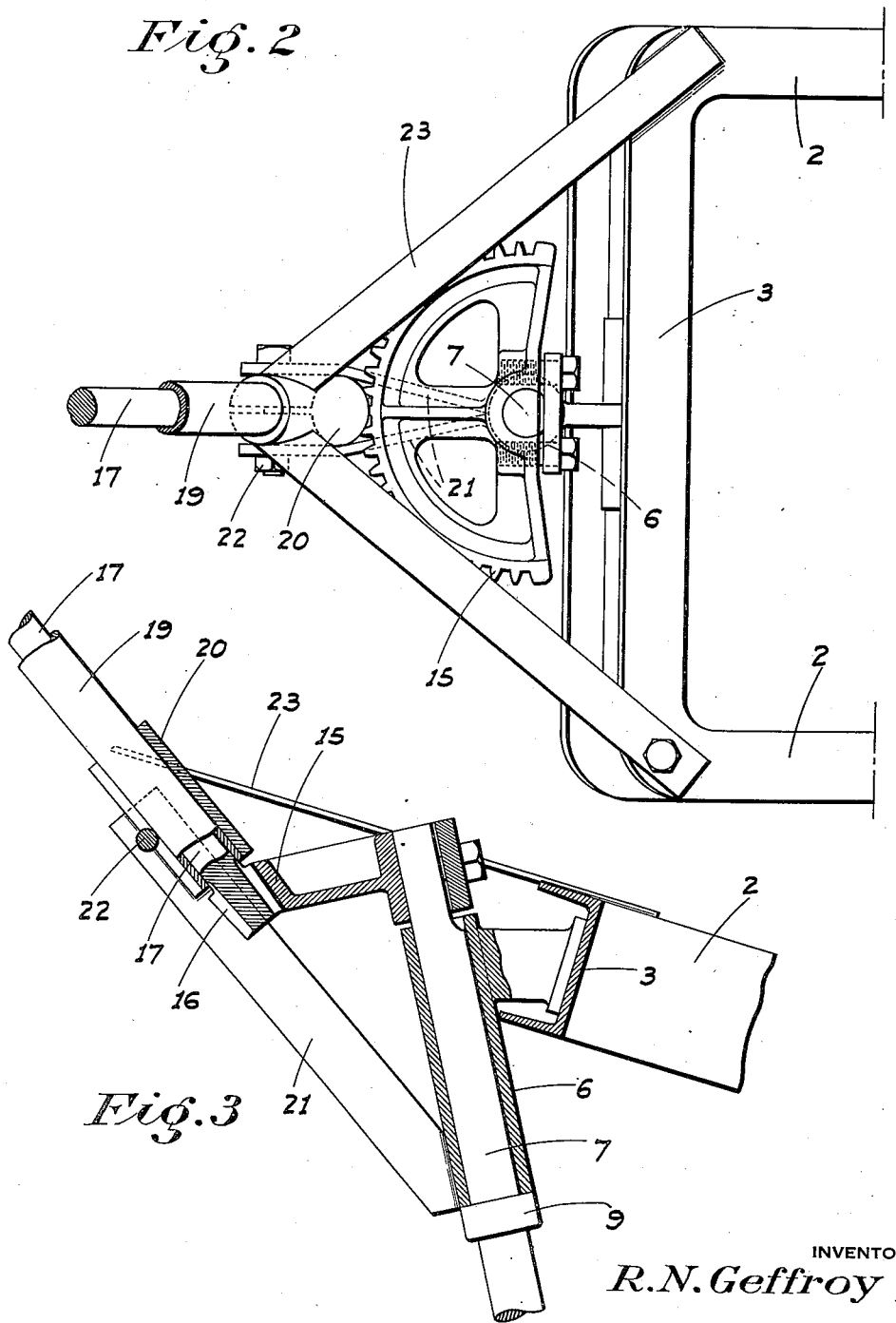

2,097,184

UNITED STATES PATENT OFFICE 2,097,184

STEERING MECHANISM FOR TRACTOR AND SWIVEL TRAILER UNITS

Ralph N. Geffroy, Stockton, Calif.

Application September 14, 1935, Serial No. 40,576

4 Claims. (Cl. 280—87)

This invention relates to agricultural implements of that type which comprises a tractor and an implement carrying trailer swivelly connected thereto, particularly such as is shown in my Patent No. 2,016,774, dated October 8, 1935.

In this structure, steering or relative angling of the tractor and trailer, was previously effected by a rigid steering or tiller bar rigid with the tractor, and operated from the trailer. Such an arrangement, however, I have found hard to operate, especially when working under a heavy pull, and it was found to be practically impossible to maintain the tractor moving in a true straight ahead line when the ground is rough, as it usually is.

The principal object of my present invention is to eliminate this objectionable feature by providing a steering mechanism so arranged that the steering movements of the tractor may be easily and accurately controlled, and the tractor maintained in a straight line of travel, or turned through any desired or possible angle, with a minimum of effort.

This new mechanism comprises essentially a rotary steering wheel mounted on the tractor and overhanging the trailer platform for operation therefrom, and reduction gear connections between the wheel and the trailer, and is arranged so that rotation of the wheel in the same direction as that in which it is desired to steer the tractor, effects the steering thereof with a minimum of physical effort. At the same time the wheel swings laterally with the tractor, so that said wheel automatically moves clear of trees or vines when working around the same; and also swings vertically with the tractor when it is desired to raise the implements from the ground. All the advantages of the rigid tiller type of steering mechanism previously used are therefore retained, plus the steady positiveness and ease of operation only obtained with gearing.

A further object of the invention is to produce a simple and inexpensive device and yet one which will be exceedingly effective for the purpose for which it is designed.

These objects I accomplished by means of such structure and relative arrangement of parts as will fully appear by a perusal of the following specification and claims.

In the drawings similar characters of reference indicate corresponding parts in the several views:

Figure 1 is a side elevation of a tractor and trailer unit, showing my improved steering mechanism.

Figure 2 is an enlarged fragmentary plan view of the mechanism.

Figure 3 is a similar sectional elevation of the same.

Referring now more particularly to the characters of reference on the drawings, the tractor used in connection with the implement and operator carrying trailer and to which the steering mechanism is applied is here shown as comprising a single wheel 1 having an engine mounted in connection therewith and driving said wheel, as shown in my Patent No. 1,987,676 dated January 15, 1935. The frame of the tractor and which is supported by the wheel comprises side beams 2 turnably supported axially of the wheel and projecting thence rearwardly and upwardly; said beams being connected at their rear ends by an integral cross member 3, as shown in Figure 2. Lower side frame bars 4 are included with the frame, these bars also extending rearwardly of the wheel and being connected by a cross beam 5.

Depending from and rigidly connected to the cross member 3 centrally thereof is a sleeve 6 turnable in which is a shaft 7 forming a connecting king-pin. This shaft is shown disposed with a slight forward angle to its lower end, although it need not necessarily be angled. The shaft at its lower end is journaled in a box 8 mounted on the crossbeam 5; upward movement of the shaft in the sleeve being prevented by a collar 9 on said shaft engaging the lower end of the sleeve 6.

An implement carrying frame 10 is rigidly secured to and projects rearwardly from shaft 7 just above the box 8; said shaft thus taking the place of the king-pin as shown in said Patent No. 2,016,774.

The operator supporting trailer is also connected to shaft 7 and comprises a platform frame 11 supported on wheels 12 as shown in said application; an arch bar 13 extending forwardly from said platform frame to a transverse pivot connection P with ears 14 projecting rearwardly from and rigid with the shaft just above the frame 10. Secured on the upper end of shaft 7, above sleeve 6, is a rearwardly facing segmental bevel gear 15 engaged by a bevel pinion 16. This pinion is on the lower end of a steering shaft 17 extending rearwardly at an upward angle to a termination in a steering wheel 18 overhanging the trailer platform in a position convenient to the operator standing thereon.

The shaft is turnably enclosed throughout its length in a column 19, the lower portion of which is surrounded by a clamping sleeve 20 split down its rear side as shown in Figure 3. Brace straps 21 are welded to the sleeve 20 to the sides of the split, and extend downwardly in converging relation to a welded connection with the sleeve 6 adjacent the bottom as shown. A bolt 22 through the straps and sleeve 20 at the split clamps the column firmly in place in said sleeve. Other substantially horizontal brace straps 23 are welded on the sides of the sleeve 20 at the top and extend forwardly in diverging relation to rigid connections with the cross member 3 at its ends. In this manner, the king-pin supporting sleeve 6 and the steering shaft supporting sleeve 20 and column 19 are connected as a unit rigid with each other and with the tractor frame.

Any swinging of the tractor in a horizontal plane is therefore accompanied by a corresponding movement of the steering post and wheel, just as if a rigid tiller bar as previously shown were used. Also, the steering post and wheel may be swung upwardly with the tractor frame, turning about the wheel axle as an axis, as when it is desired to raise the implements from the ground.

When it is desired to steer or angle the trailer relative to the tractor, rotation of the steering wheel in the same direction as that in which it is desired to steer or angle the structure, will cause the post 17 and pinion 16 to swing with the tractor about the relatively stationary shaft 7 as an axis, thus angling the tractor relative to the trailer, which is rigid with the shaft in a horizontal plane.

This tendency of the tractor frame to swing about the shaft 7 as an axis is occasioned by the fact that when the implements on the trailer frame are in the ground, there is greater resistance to lateral movement of the implement and trailer frame than there is to the tractor wheel turning on the surface of the ground. Under these circumstances, therefore, the gear 15 acts more or less as a stationary rack gear about which the gear 16 crawls as the post 17 is turned. This in turn causes the tractor frame and the steering post, which is rigidly connected therewith; to turn in an arc about the pin 7, as an axis. If the steering wheel and post are turned to steer the tractor wheel toward a tree, the post and wheel themselves being at the rear end of the tractor frame and on the opposite side of the pivot pin will swing in an arc away from the tree. Thus, as the operator leans out to clear the low limbs or branches as he steers the tractor close to a tree, the steering wheel and all the controls move out with him. If this were not so, the steering wheel might catch on the low limbs or branches and be damaged or broken.

There is thus no chance for confusion in operation, since the functioning and results are perfectly natural. It should also be noted that in the entire range of turning (and which is substantially through an arc of 180 degrees) all operations are controlled or performed from a convenient steering position, without any reaching on the part of the operator being necessary at any time. The short or sharp turning feature permitted by the gear arrangement is also very important in this type of implement, which is primarily designed for working small plots. Also, the steering column being rigid with the tractor, the necessary engine controls may be mounted on said column where they are handy in all steering positions, and without the use of flexible joints, universal couplings and other relatively expensive parts being necessary.

My general steering arrangement is of particular advantage when pulling seed planters, since with the trailer wheels set 60 inches apart for instance (as in double row planting) it is practically impossible to hold the tractor in a straight path without the aid of the gearing. With my arrangement, the rows are planted straight and true, as distinguished from the zigzag rows unavoidably obtained with a rigid tiller type steering apparatus.

On a hard plowing job, there is a tendency for the tractor to "stiffen out", making it exceedingly difficult to steer with a direct connected rigid tiller but which is easily overcome with the reduction-gear steering arrangement. With my arrangement, after a turn has been made, it is only necessary to release the wheel whereupon the tractor and trailer will return of themselves to a straight line position. This is because the "lead" of the tractor is properly maintained due to the positioning of the substantially vertical king-pin steering shaft. It should here be noted that this shaft is disposed substantially equidistant between the point of pull of the tractor wheel and the trailer wheels, and it is thus a natural, normal consequence that the straight ahead position will be automatically and immediately sought. To maintain this position in undeviating steadiness, and to angle the tractor from this position, with extreme ease, is the very desirable result obtained with my steering gear arrangement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination, a tractor, a trailer, a king-pin rigid with the forward end of the trailer, an upstanding sleeve fixed on the rear end of the tractor through which the king-pin turnably projects, a gear fixed on the king-pin above the sleeve, a pinion engaging the gear on its rear side, a steering shaft rigid with the pinion, a sleeve above the pinion, a steering column clamped in the sleeve and turnably engaging the steering shaft, braces between the last named sleeve and the frame of the tractor ahead and to the sides of the gear and other braces extending directly between and connecting the sleeves.

2. In combination, a tractor, a trailer, a king pin rigid with the forward end of the trailer, an upstanding sleeve fixed on the rear end of the tractor through which the king pin turnably projects, a gear fixed on the king pin above the sleeve, a pinion engaging the gear at its rear face, a turnable steering shaft rigid with the pinion, a steering column about the shaft, and a supporting structure mounted in fixed connection with the tractor and sleeve and supporting the column, said column being secured in the structure directly above the pinion.

3. A device as in claim 2, in which the pinion and gear are beveled and are disposed so that the steering shaft extends at an upward angle to the rear to bring its upper end a considerable distance rearwardly of the king pin.

4. In combination, a tractor having a single drive wheel providing a ground engaging point about which the tractor may swing horizontally, a trailer, a pair of wheels supporting the trailer adjacent its rear end and about which the trailer may swing horizontally, a substantially vertical swivel coupling between the trailer and tractor whereby the tractor and trailer may swing horizontally relative to the ground and steering means applied at the coupling to thus relatively swing the tractor and trailer; said coupling being substantially midway between vertical planes through the tractor and trailer wheel axes.

RALPH N. GEFFROY.